United States Patent
Ahmed et al.

(10) Patent No.: US 10,285,033 B2
(45) Date of Patent: May 7, 2019

(54) SYSTEM AND METHOD FOR PROPAGATION OF SERVER INFORMATION IN A DATA CENTER WITH MASTER SYSTEM ELECTION

(71) Applicant: DELL PRODUCTS, LP, Round Rock, TX (US)

(72) Inventors: Sajjad Ahmed, Austin, TX (US); Jeffrey M. Lairsey, Round Rock, TX (US); Arulnambi Raju, Austin, TX (US); Minhaz Islam, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

(21) Appl. No.: 15/660,781

(22) Filed: Jul. 26, 2017

(65) Prior Publication Data

US 2019/0037337 A1    Jan. 31, 2019

(51) Int. Cl.
*G06F 8/65* (2018.01)
*H04W 4/80* (2018.01)
*H04L 29/08* (2006.01)
*H04W 76/14* (2018.01)

(52) U.S. Cl.
CPC ............... *H04W 4/80* (2018.02); *G06F 8/65* (2013.01); *H04L 67/34* (2013.01); *H04W 76/14* (2018.02)

(58) Field of Classification Search
CPC ...................................................... H04L 41/04
See application file for complete search history.

(56) References Cited

U.S. PATENT DOCUMENTS

| | | | |
|---|---|---|---|
| 8,429,642 B1 | 4/2013 | Cheng et al. | |
| 2004/0193865 A1* | 9/2004 | Nguyen | 713/2 |
| 2008/0209414 A1 | 8/2008 | Stein | |
| 2011/0010229 A1* | 1/2011 | Ow | 705/14.1 |
| 2012/0185553 A1* | 7/2012 | Nelson | 709/209 |
| 2012/0275360 A1* | 11/2012 | Berenberg | H04W 52/0241 370/311 |
| 2015/0067019 A1* | 3/2015 | Balko | H04L 67/10 709/202 |

* cited by examiner

*Primary Examiner* — Hsinchun Liao
(74) *Attorney, Agent, or Firm* — Larson Newman, LLP (57) ABSTRACT

A data center includes processing devices and a mobile device. The processing devices are configured to determine a suitability grade, receive another suitability grade from another processing device via a wireless interface connection, determine that the suitability grade is higher than the other suitability grade, and provide an indication to the other processing device that the processing device is a master processing device in response to determining that the suitability grade is higher than the other suitability grade. The mobile device sets up another wireless interface connection with a first one of the processing devices, determines that the first processing device is a master processing device, and provides an update for another one of the processing devices to the first processing device in response to determining that the first processing device is the first master processing device. The processing device is further configured to provide the update to the other processing device.

18 Claims, 4 Drawing Sheets

SYSTEM AND METHOD FOR PROPAGATION OF SERVER INFORMATION IN A DATA CENTER WITH MASTER SYSTEM ELECTION

FIELD OF THE DISCLOSURE

This disclosure generally relates to information handling systems, and more particularly relates to propagation of server information in a data center with master system election.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A data center may include processing devices and a mobile device. The processing devices may be configured to determine a suitability grade, receive another suitability grade from another processing device via a wireless interface connection, determine that the suitability grade is higher than the other suitability grade, and provide an indication to one of the processing devices that the other processing device is a master processing device over. The mobile device may be configured to set up another wireless interface connection with a first one of the processing devices, determine that the first processing device is a master processing device, and provide an update for another one of the plurality of processing devices to the first processing device in response to determining that the first processing device is the first master processing device. The processing device may be further configured to provide the update to the other processing device.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
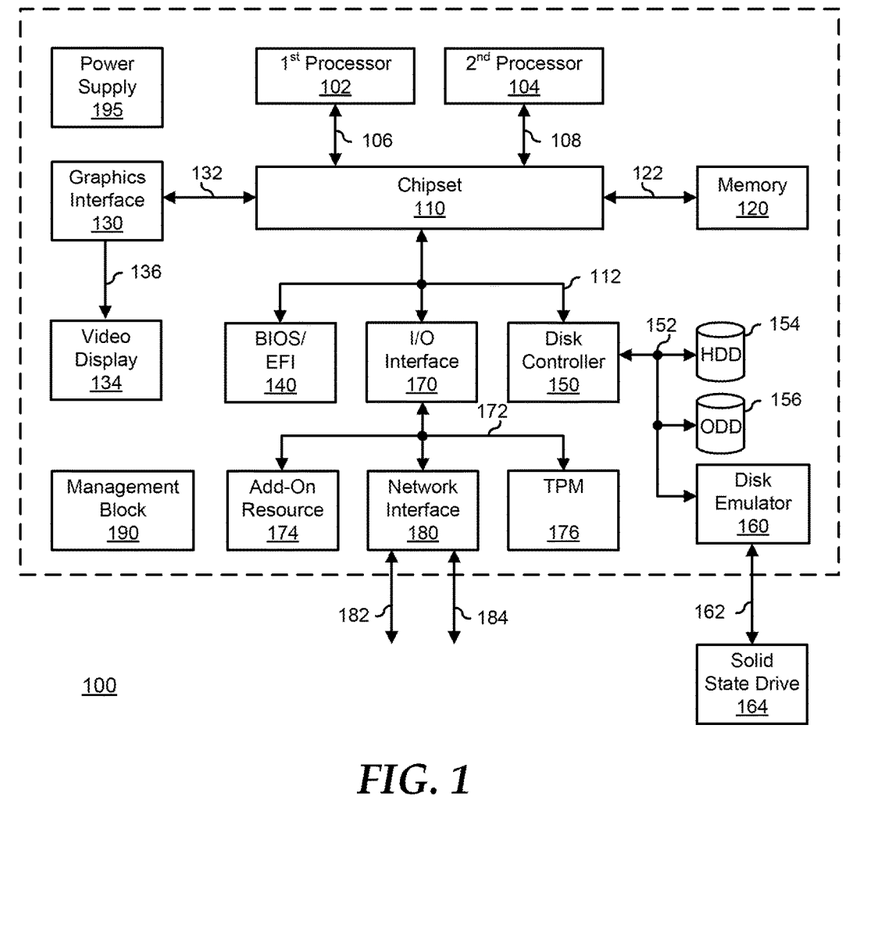
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the OPF system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/extensible firmware interface (BIOS/EFI) module 140, a disk controller 150, a hard disk drive (HDD) 154, an optical disk drive (ODD) 156, a disk emulator 160 connected to an external solid state drive (SSD) 162, an input/output (I/O) interface 170, one or more add-on resources 174, a trusted platform module (TPM) 176, a network interface 180, a management block 190, and a power supply 195. Processors 102 and 104, chipset 110, memory 120, graphics interface 130, BIOS/EFI module 140, disk controller 150, HDD 154, ODD 156, disk emulator 160, SSD 162, I/O interface 170, add-on resources 174, TPM 176, and network interface 180 operate together to provide a host environment of information handling system 100 that operates to provide the data processing functionality of the information handling system. The host environment operates to execute machine-executable code, including platform BIOS/EFI code, device firmware, operating system code, applications, programs, and the like, to perform the data processing tasks associated with information handling system 100.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management block 190 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. In particular, management block 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management block 190 can include a network connection to an external management system, and the management block can communicate with the management system to report status information for information handling system 100, to receive BIOS/UEFI or system firmware updates, or to perform other task for managing and controlling the operation of information handling system 100. Management block 190 can operate off of a separate power plane from the components of the host environment so that the management block receives power to manage information handling system 100 when the information handling system is otherwise shut down. An example of management block 190 may include a commercially available BMC product that operates in accordance with an Intelligent Platform Management Initiative (IPMI) specification, such as a Integrated Dell Remote Access Controller (iDRAC), or the like. Management block 190 may further include associated memory devices, logic devices, security devices, or the like, as needed or desired.

Power supply 195 represents one or more devices for power distribution to the components of information handling system 100. In particular, power supply 195 can include a main power supply that receives power from an input power source, such as a wall power outlet, a power strip, a battery, or another power source, as needed or desired. Here, power source 195 operates to convert the power at a first voltage level from the input power source to one or more power rails that are utilized by the components of information handling system. Power supply 195 can also include one or more voltage regulators (VRs) that each receive power from the main power supply and that operate to convert the input voltage to an output voltage that is used by one or more components of information handling system. For example, a VR can be provided for each of processors 102 and 104, and another VR can be provided for memory 120. Power supply 195 can be configured to provide a first power plane that provides power to the host environment, and to provide a second power plane that provides power to the management environment.

Figure 2:
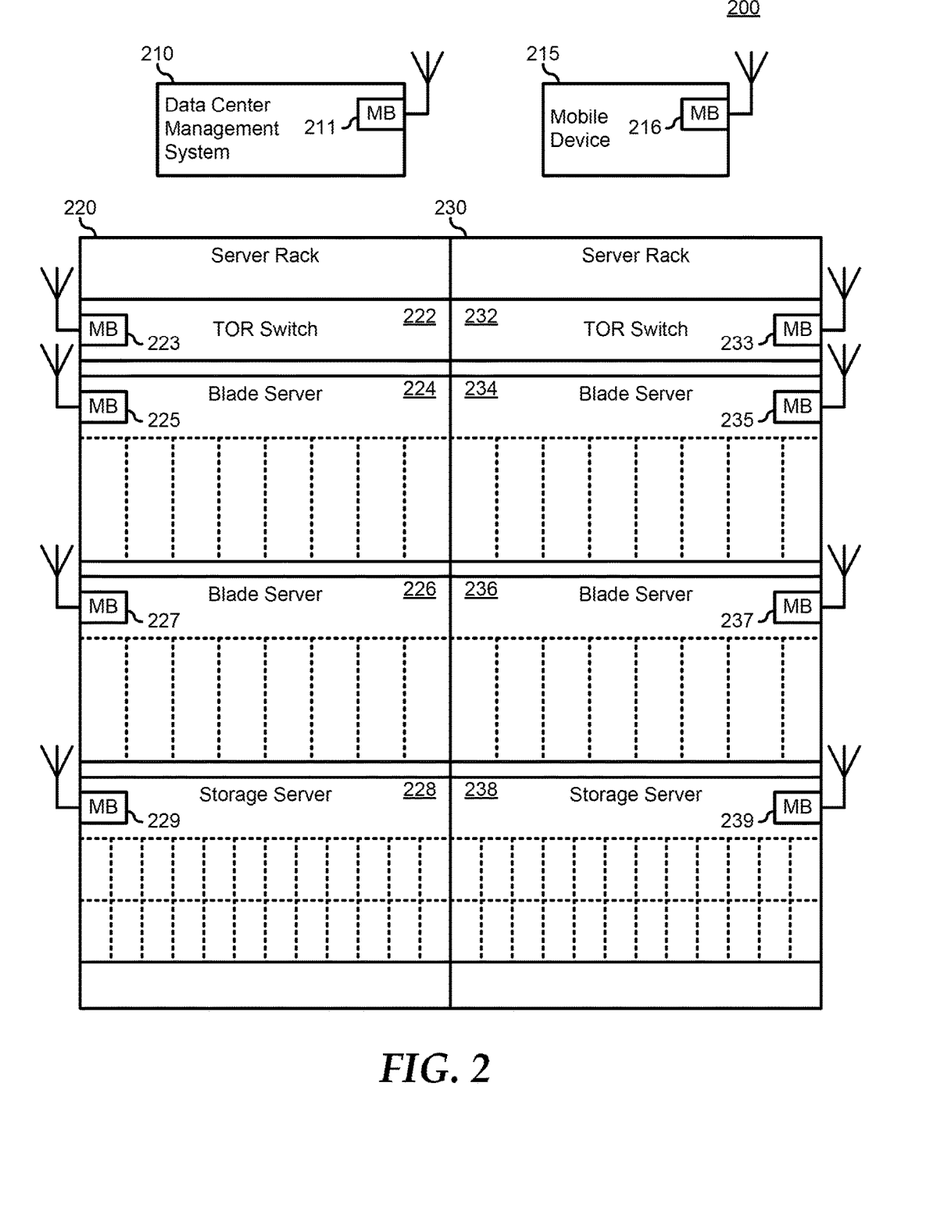
FIGS. 2 and 3 are block diagrams illustrating an information handling system according to an embodiment of the present disclosure.
Figure 3:
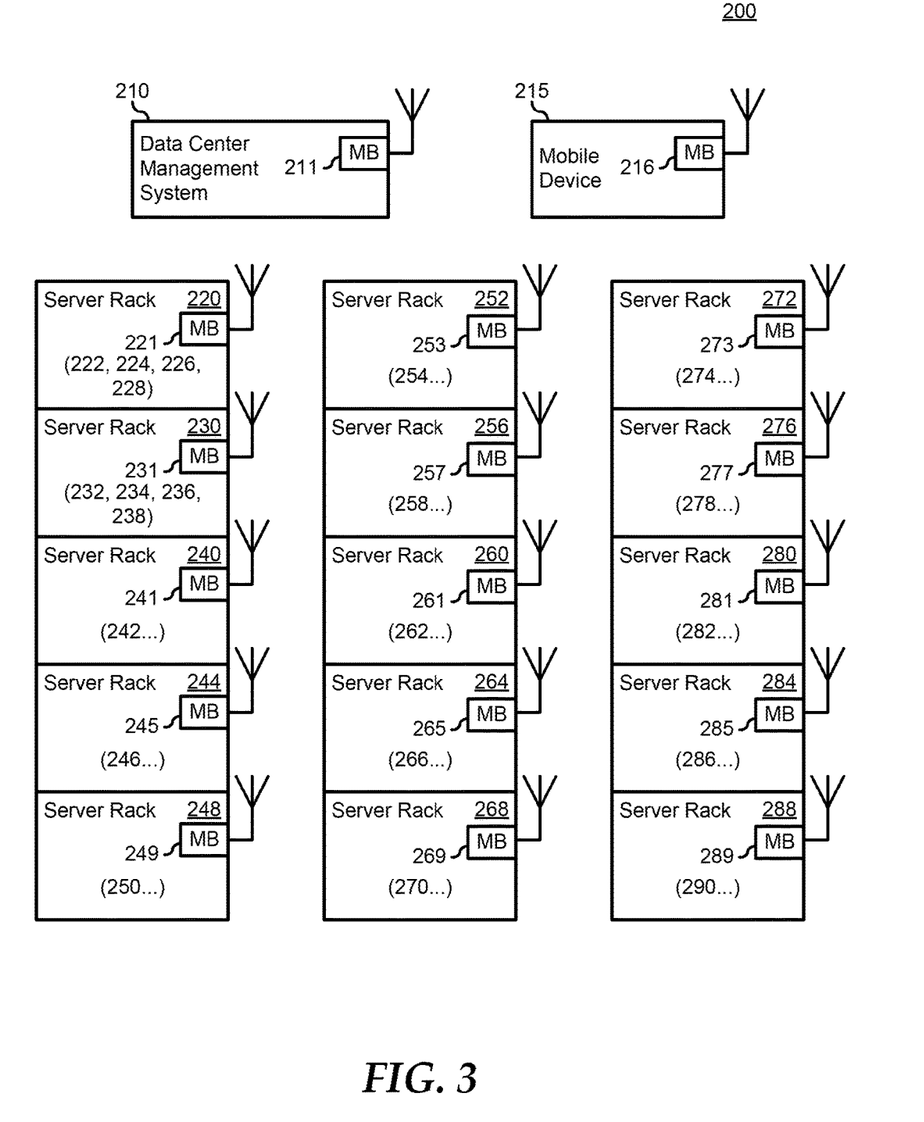

FIGS. 2 and 3 illustrate a data center 200. In particular, FIG. 2 illustrates a portion of data center 200, including a data center management system 210 and server racks 220 and 230. Data center 200 represents a collocated group of networked information handling systems utilized by an organization to provide remote storage, processing, and distribution of large amounts of data. In a particular embodiment, the processing elements of data center 200, as described below, are networked together via a data backbone that provides high bandwidth communication paths between the processing elements to enable the storage, processing, and distribution of the data handled by the data center. The data backbone can be implemented as one or more network, communication, or storage fabrics, such as a Multi-Gigabit Ethernet, Fibre Channel or Fibre-Channel-Over-Ethernet (FCoE), Serial ATA, PCI-e, Serial Attached SCSI (SAS), or another stand-alone or hybrid fabric, as needed of desired.

In addition to the data backbone, the processing elements of data center 200 are networked together via a management network that provides for the OOB management of the respective processing elements of the data center, and each processing element includes one or more management block similar to management block 190. In a particular embodiment, the management network is provided in data center 200 as a network similar to the data backbone, but that is separate from the data backbone. In another embodiment, the management network is provided in data center 200 by the data backbone, but where the management network traffic is isolated from the data traffic of the host processing system of the processing elements of the data center. Here, the management traffic can be isolated by establishing a virtual private network (VPN) between the processing elements of data center 200 over the data backbone.

Additionally, whether the management network is provided by a separate network, or is provided as isolated network traffic on the data backbone, data center 200 is configured to provide the management network wirelessly. Here, the management blocks of each processing element of data center 200 includes a wireless communication interface that permits the processing elements of the data center to communicate with each other outside of the management network, and to permit a user of a mobile device to connect to the management block of the associated processing element to gain management access to the functions and features of the management block. As such, the wireless communication interface represents a wireless data communication interface for short-range wireless communications. For example, the wireless communication interface may include a wireless data communication interface for establishing a Personal Area Network (PAN), such as a Near-Field Communication (NFC) interface, a Bluetooth interface, a Bluetooth-Low Energy (Bluetooth-LE) interface, or the like, or for establishing a Wireless Local Area Network (WLAN), such as a WiFi or 802.11 interface or the like, or another wireless interface.

Data center management system 210 represents one or more information handling system that is connected to the management network, and provides a centralized user interface for directing and controlling the various management functions and features of the management system, such as the retrieval of information related to the operation of the processing elements of data center 200, the provision of BIOS/UEFI or system firmware updates, and the management of non-processing components of processing elements of the data center, such as system cooling fans and power supplies. Data center management system 210 includes a management block 211 with a wireless communication interface, as indicated by an antenna symbol connected to the management block. Here, management block 211 is similar to management block 190 less in terms of the management capabilities being utilized to manage data center management system 210 itself, but in terms of its ability to participate in the management network, to provide a repository for the BIOS/UEFI or system firmware updates for a wide variety of processing elements of data center 200, as described further, below.

Server racks 220 and 230 represent standardized enclosures for mounting the processing elements of data center 200. An example of server racks 220 and 230 includes a standard enclosure for mounting processing elements that have a front panel that is 19 inches (48.3 cm) wide. One or more of server racks 220 and 230 may include a management block similar to management block 190 for providing a centralized node to provide management functions for the processing elements of the server racks, as needed or desired. For the purposes of this disclosure, references to communications with a server rack will be understood to include communications with the processing elements mounted within the server rack.

Server rack 220 includes a top-of-rack (ToR) switch 222, blade servers 224 and 226, and a storage server 228. ToR switch 222 represents a network switch and router that handles the switching and routing between the other processing elements of server rack 220 and the data backbone. ToR switch 222 includes a management block 223 with a wireless communication interface. Blade servers 224 and 226 represent modular devices that provide multiple, similarly configured data processing servers, called blades, to provide the data processing capacity of server rack 220. In a particular embodiment, blade servers 224 and 226 provide multiple servers on each blade, such that the blade server may represent upwards of 160 server nodes (ten nodes on each of 16 blades) or more. Blade server 224 includes a management block 225 with a wireless communication interface, and blade server 226 includes a management block 227 with a wireless communication interface. In a particular embodiment, management blocks 225 and 226 represent multiple similar management blocks, one for the blade server chassis management, and one for each of the blades in the server blade. As such, management blocks 225 and 227 may each represent up to 17 management blocks, or more, as needed or desired. Storage server 228 represents a network attached storage (NAS), a storage-area network (SAN), or another storage architecture to provide data storage for server blades 224 and 226. Storage server 228 includes a management block 229 with a wireless communication interface. Server rack 230 includes a ToR switch 232, blade servers 234 and 236, and a storage server 238. ToR switch 232 includes a management block 233 with a wireless communication interface. Blade servers 234 and 236 each include respective management blocks 235 and 237, each with a wireless communication interface. Storage server 238 includes a management block 239 with a wireless communication interface.

As illustrated, server racks 220 and 230 are configured with similar processing elements, but this is not necessarily so, and the skilled artisan will understand that server racks may include similar processing elements or different processing elements, as needed or desired, and that additional types of processing elements may be mounted in a server rack, as needed or desired. As such, FIG. 3 shows an overhead view of data center 200, including data center management system 210, and server racks 220, 230, 240, 244, 248, 252, 256, 260, 264, 268, 272, 276, 280, 284, and 288. Server rack 220 is shown as including processing elements 222, 224, 226, and 228, and server rack 230 is shown as including processing elements 232, 234, 236, and 238, as described above. Here, however, rather than showing separate management blocks for each of the processing elements, server rack 220 is shown as including a management block 221 and server rack 230 is sow as including a management block 231. However, management block 221 will be understood to represent management blocks 223, 225, 227, and 229, and management block 231 will be understood to represent management blocks 233, 235, 237, and 239. Similarly, server racks 240, 244, 248, 252, 256, 260, 264, 268, 272, 276, 280, 284, and 288 may each include multiple processing elements and multiple management blocks, but are shown with representative processing elements 242, 246, 250, 254, 258, 262, 266, 270, 274, 278, 282, 286, and 290 and with representative management blocks 241, 245, 249, 253, 257, 261, 265, 269, 273, 277, 281, 285, and 289.

In a particular embodiment, data center management system 210 operates to establish a wireless point-to-point management network between management block 211 and each of management blocks 221, 231, 241, 245, 249, 253, 257, 261, 265, 269, 273, 277, 281, 285, and 289. For example, where the management blocks are all equipped to provide a WLAN wireless communication interface, such as a 802.11 (WiFi) interface, management block 211 can act as a wireless access point, granting access to each of management blocks 221, 231, 241, 245, 249, 253, 257, 261, 265, 269, 273, 277, 281, 285, and 289, via secure credentialing, as is known in the art. Further, where data center 200 occupies a physically large space, that is, greater than the typical distance over which a WLAN communication connection can be established, one or more repeaters can be provided to extend the range of management block 211 to establish point-to-point connections with all of the other management blocks. Here, when data center management system 211 obtains BIOS/UEFI or system firmware updates for the processing elements of data center 200, then the management system provides the appropriate BIOS/UEFI or system firmware updates directly to the affected processing elements via each respective processing element's management block. For example, were each of server racks 220, 230, 240, 244, 248, 252, 256, 260, 264, 268, 272, 276, 280, 284, and 288 include a ToR switch similar to ToR switches 222 and 232, then when data center management system 210 obtains a system firmware update for the ToR switches, the data center management system can send the system firmware update to each ToR switch. The same can be done for blade servers, storage servers, or other processing elements of data center 200. In this embodiment, data center management system 210 must manage a large number of point-to-point connections. For example, where a particular server rack includes a ToR switch with one management block, three blade servers with 17 or more management blocks, and a storage server with another management block, the server rack can require 53 or more point-to-point connections. Thus, for a data center with 100 server racks, data center management system 210 may need to support 5000-6000 point-to-point connections to properly service the entire data center.

In another embodiment, the wireless communication interfaces of management blocks 211, 221, 231, 241, 245, 249, 253, 257, 261, 265, 269, 273, 277, 281, 285, and 289 represent wireless data communication interfaces for establishing a PAN such as NFC interfaces, Bluetooth interfaces, Bluetooth-LE interfaces, or the like. As such, management blocks 211, 221, 231, 241, 245, 249, 253, 257, 261, 265, 269, 273, 277, 281, 285, and 289 can be configured to establish point-to-point connections with the management blocks that are within the range of the PAN. For example, point-to-point connections can be made between management blocks that are within 10 meters of each other, such as between management blocks within a same server rack, within adjacent server racks, and within server racks that are across an aisle. In a first case, a mobile device 215 includes a management block 216 with a wireless communication interface for establishing a PAN. Here, when data center management system 211 obtains BIOS/UEFI or system firmware updates for the processing elements of data center 200, then the data center management system provides the appropriate BIOS/UEFI or system firmware updates to mobile device 215, and a user of the mobile device moves the mobile device into the proximity of the affected processing elements to establish the point-to-point wireless communication connection between management block 216 and the processing element via their respective management blocks. Then mobile device 215 provides the appropriate BIOS/UEFI or system firmware update to the processing element. However, where multiple processing elements of data center 200 are in need of receiving the same BIOS/UEFI or system firmware update, this case leads to a time consuming task of approaching to within the PAN range of each processing element that is need of the BIOS/UEFI or system firmware update.

In another case, management blocks 211, 221, 231, 241, 245, 249, 253, 257, 261, 265, 269, 273, 277, 281, 285, and 289 operate to establish point-to-point connections with the management blocks that are within range of the wireless communication interfaces that form the PAN. For example, management block 221 may be within range of and establish point-to-point connections with management blocks 231 and 253. In turn, management block 231 may be within range of and establish point-to-point connections with management blocks 241 and 257. Similar point-to-point connections can be established until finally management blocks 269 and 285 are determined to be within range of and establish point-to-point connections with management block 289. Here, mobile device 215 need only to make a single point-to-point connection and to provide the BIOS/UEFI or system firmware updates to the management block with which the point-to-point connection is made.

Then, in a first sub-case, the management block that received the BIOS/UEFI or system firmware updates transmits the BIOS/UEFI or system firmware updates to all of the other management blocks with which it has a point-to-point connection. In turn, each connected management block propagates the BIOS/UEFi or system firmware updates to each other management block to which it is connected, until all management blocks have received the BIOS/UEFI or system firmware updates. Then, each management block determines if the associated processing element can utilize the BIOS/UEFI or system firmware update, and only applies the BIOS/UEFI or system firmware updates that apply to itself. In this sub-case, a large quantity of the storage resources of each processing element is utilized for storing BIOS/UEFI and system firmware updates that may not be needed by the processing elements.

In a second sub-case, the management block that received the BIOS/UEFI or system firmware update transmits an indication as to the nature of the update to all of the other management blocks with which it has a point-to-point connection, and each connected management block propagates the indication to each other management block to which it is connected, until all management blocks have received the indication. Then each management block determines if the associated processing element can utilize the BIOS/UEFI or system firmware update. If so, the management block that can utilize the BIOS/UEFI or system firmware update sends a reply back to the management block that received the BIOS/UEFI or system firmware update to send the BIOS/UEFI or system firmware update. The BIOS/UEFI or system firmware updates are then propagated through the network of management blocks to the management block that can utilizes the BIOS/UEFI or system firmware update. In either of the above sub-cases, the user of mobile device 215 need only connect to a single processing element in order to provide BIOS/UEFI or system firmware updates to all of the processing elements of data center 200. In this sub-case, less of the storage resources of each processing element is needed because unused BIOS/UEFI and system firmware updates are not stored on each processing element. However, in this sub-case, each management block must process additional steps to negotiate the receipt of the applicable BIOS/UEFI or system firmware updates that are needed by the associated processing element.

In another embodiment, one or more management blocks 221, 231, 241, 245, 249, 253, 257, 261, 265, 269, 273, 277, 281, 285, or 289 are designated as sub-network masters. Here the sub-network masters each establish point-to-point connections with the management blocks of the nearest processing elements, and with the other sub-network masters that are within range. For example, management block 223 of ToR switch 222 can be designated as the sub-net master for the processing elements of server rack 220. Similarly, management block 233 of ToR switch 232 can be designated as the sub-net master for the processing elements of server rack 230. Here management block 223 can establish point-to-point connections with management blocks 225, 227, and 229 as the processing elements that compose the sub-network over which management block 223 is the master. Similarly, management block 233 can establish point-to-point connections with management blocks 235, 237, and 239 as the processing elements that compose the sub-network over which management block 233 is the master. Further, management blocks 223 and 233, each as being designated sub-network masters, can establish a point-to-point connection between each other.

Then, when mobile device 215 makes a point-to-point connection with one of management blocks 223 or 233, the mobile device provides any and all available BIOS/UEFI or system firmware updates to the management block with which the point-to-point connection is made, and management block propagates the BIOS/UEFI or system firmware updates to the processing elements of the associated sub-network and to the other connected sub-network masters. For example, if mobile device 215 connects to management block 223 with a BIOS/UEFI update for server blades 224 and 226, then management block 223 can store the BIOS/UEFI update on ToR switch 222, and can send the BIOS/UEFI update to management blocks 225 and 227 to update the server blades and to management block 233 because it is a connected sub-network master. Then management block 233 can store the BIOS/UEFI update on ToR switch 232, and can send the BIOS/UEFI update to management blocks 235 and 237 to update the server blades and to the connected management block of other sub-network masters to which management block 233 is connected.

Alternatively, management blocks that are sub-network masters can propagate BIOS/UEFI or system firmware updates to the processing elements within its sub-network by sending an indication as to the applicability of the BIOS/UEFI or system firmware update to the processing elements with the sub-network. Then the processing elements that can utilized the BIOS/UEFI or system firmware updates can send a request to receive the applicable BIOS/UEFI or system firmware updates.

Note that mobile device 215 is not limited to making point-to-point connections with only the designated sub-network masters, but will, more likely make point-to-point connections to processing elements of a sub-network that is not the sub-network master. Here, in a first case, the management block to which the mobile device is connected operates to receive all available BIOS/UEFI or firmware updates from the mobile device, and then to provide the BIOS/UEFI or firmware updates its associated sub-network master. In a second case, the management block to which the mobile device is connected operates to provide the mobile device with the identity of its associated sub-network master. The mobile device then disconnects from the management block and establishes a point-to-point connection with the management block of the sub-network master.

Note that a sub-network is not necessarily limited to the processing elements within a particular server rack, but may encompass processing elements from neighboring server racks, from server racks that are across an aisle of the data center, from server racks that are behind the particular server rack, or from other locations. In fact, it may be deemed to be advantageous to designate sub-network masters such that a maximum number of processing elements of the data center are with each sub-network, and to thereby reduce the number of designated sub-network masters to a minimum number needed to ensure complete coverage of all processing elements within the data center.

In a particular embodiment, the designated sub-network masters are statically determined. For example, where management block 261 of server rack 260 is proximate enough to all of the processing elements of data center 200 to establish point-to-point connections, then management block 261 can be statically determined as the sub-network master for all of the processing elements of the data center. In another example, where each management block is proximate enough to the processing elements of the adjacent server racks, an administrator may select management block 257 of server rack 256 as a first sub-network master with management blocks 221, 231, 241, 253, 261, 273, 277, and 281 in a first sub-network, and may select management block 269 of server rack 268 as a second sub-network master with management blocks 245, 249, 265, 285, and 289 in a second sub-network, and provide a point-to-point connection between management blocks 257 and 269 as the sub-network masters. Note that the processing elements selected as members of a particular sub-network may be selected as being the most proximate processing elements to which the sub-network master can make point-to-point connections, rather than selecting all processing elements to which the sub-network master can possibly make point-to-point connections. That is, the possible connection coverage of the various sub-network masters may be selected such that some processing elements may be in either of two or more sub-networks. In particular, it may be desirable to place sub-network masters at an outer limit of the range of the PAN wireless communication interfaces.

In another embodiment, the designated sub-network masters are determined based upon an election process between the processing elements of data center 200. Here, each processing element is graded based upon an evaluation of the particular processing element's suitability to perform the functions of a sub-network master. The processing elements share their grades with each other, and come to an agreement upon which processing element should be determined as the sub-network master. The determined sub-network master then establishes the point-to-point connections to the other processing elements of the sub-network, and with the adjoining sub-network masters, and updates are provided as described above.

Each processing element evaluates its suitability to perform the functions of a sub-network master based upon values assigned to various weighted variables related to the performance of the particular processing element that are deemed to be relevant to the selection of a sub-network master. An example of the variables may include a number of processing elements to which the particular processing element can reliably make a point-to-point connection, resource utilization levels of the processing resources of the particular processing element, a health status of the particular processing element, temperature of the particular processing element, a fan speed of the particular processing element, a voltage level provided by a voltage regulator of the particular processing element, or another variable that may be deemed to be relevant to the selection of a sub-network master. An example of a resource utilization level may include a measure of CPU utilization in the particular processing element, a measure of I/O bandwidth utilization in the particular processing element, a measure of storage bandwidth utilization in the particular processing element, a measure of storage capacity utilization in the particular processing element, or another measure of resource utilization, as needed or desired. An example of a health status may include an overall health status for the particular processing element, such as whether the processing element is in a "green," or good, health status, an "amber," or moderate, health status, or a "red," or bad, health status, or may include component health status information, such as a fan health status, a processor health status, a memory health status, a disk health status, or another component health status, as needed or desired.

The variables can be assessed as either adding or subtracting from the grade for each particular processing element, and each variable can be given a weighting. An example grade may be given as:

$$H(A(C)+B_1/(\% \ U_1)+B_2/(\% \ U_2)+B_3/(\% \ U_3)) \quad \text{Equation 1}$$

where H is a health status grade, for example where $H_{green}=1$, $H_{amber}=0.5$, and $H_{red}=0$, C is a count of the number of processing elements to which the particular processing element can reliably make a point-to-point connection, A, $B_1$, $B_2$, and $B_3$ are weighting factors, and $U_1$, $U_2$, and $U_3$ are utilization percentages for various components of the processing element. Thus, processing elements that are in a "red" health status will be given a grade of "0," and will not be selected as the sub-network master, processing elements that can be connected to a larger number of other processing elements will be more favorably graded, and processing elements that are more heavily utilized will be less favorably graded. The grades for each processing element within a sub-network are compared with each other, and the processing element with the highest grade is determined to be the sub-network master. The weighting factors may be selected based upon a predetermined weighting scheme, a machine learning algorithm that analyzes the behavior of data center 200 over time, a particular algorithm, or another method, as needed or desired.

In a particular embodiment, the determination of the sub-network masters is made dynamically. As such, the operating conditions within data center 200 can be periodically reevaluated to ensure that a more suitable sub-network master is selected based upon changes in the operational status of the processing elements of the data center. For example, a reevaluation of the operating conditions of the processing elements can be performed on a daily basis, on a weekly basis, on a monthly basis, or on another periodic basis, as needed or desired. In another embodiment, when a user of mobile device 215 connects to a particular management block that is not associated with the sub-network master, the management block assumes the roll of sub-network master for a short duration, in order to provide any BIOS/UEFI or system firmware updates to the original sub-network master and to any processing elements within the sub-network that need to utilize the BIOS/UEFI or system firmware updates. Then, after the processing elements receive the BIOS/UEFI or system firmware updates, the temporary sub-network master relinquishes the roll as master to the original sub-network master.

Figure 4:
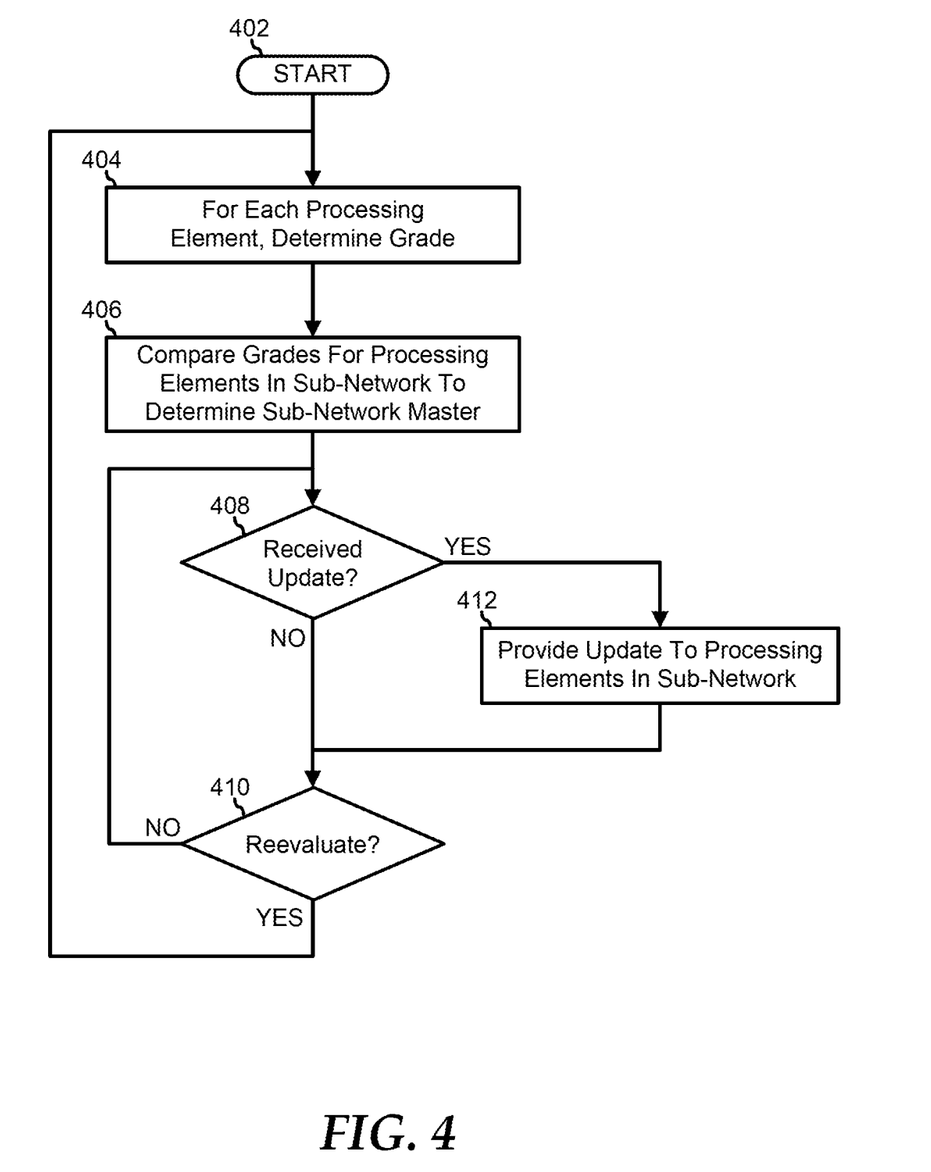
FIG. 4 is a flowchart illustrating a method for propagation of server information in a data center with master system election according to an embodiment of the present disclosure.

FIG. 4 illustrates a method for propagation of server information in a data center with master system election starting at block 402. Each processing element of a data center determines a grade that forms an evaluation of each processing element's suitability to operate as a sub-network master in block 404. For example, the processing elements of data center 200 can utilize an equation similar to Equation 1 to provide a grade for each processing element. The processing elements in each sub-network compare their grades to determine a sub-network master in block 406. For example, a particular processing element of data center 200 may have a highest grade from among the processing elements of a sub-network, and that particular processing element can be determined as the sub-network master.

A decision is made as to whether or not the sub-network master has received a BIOS/UEFI or system firmware update in decision block 408. If not, the "NO" branch of decision block 408 is taken and the method proceeds to decision block 410 as described below. If the sub-network master has received a BIOS/UEFI or system firmware update, the "YES" branch of decision block 408 is taken, the sub-network master provides the BIOS/UEFI or system firmware update to the processing elements that can utilize the update. For example, a management block can provide an indication of the existence of the BIOS/UEFI or system firmware update to the processing elements of the sub-network, and the processing elements can determine if they can utilize the update. If so, the processing elements can request the BIOS/UEFI or system firmware update from the sub-network master, and the method proceeds to decision block 410, where a decision is made as to whether or not a reevaluation of the grade of each processing element in the data center is due. If not, the "NO" branch of decision block 410 is taken and the method returns to decision block 408 where a decision is made as to whether or not the sub-network master has received a BIOS/UEFI or system firmware update. If a reevaluation of the grade of each processing element in the data center is due, the "YES" branch of decision block 410 is taken and the method returns to block 404 where each processing element of the data center determines its grade.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system, comprising:
    a plurality of processing devices, each processing device configured to:
        determine a first suitability grade for the particular processing device, wherein the first suitability grade is determined based upon a number of wireless interface connections the particular processing device has with the other processing devices;
        receive a second suitability grade from another of the processing devices via a first wireless interface connection set up with the other processing device;
        determine that the first suitability grade is higher than the second suitability grade; and
        provide an indication to the other processing device that the particular processing device is a master processing device via the first wireless interface connection in response to determining that the first suitability grade is higher than the second suitability grade;
    a mobile device configured to:
        set up a second wireless interface connection with a first one of the processing devices;
        determine that the first processing device is the master processing device; and
        provide an update for a second one of the processing devices to the first processing device in response to determining that the first processing device is the master processing device;
    wherein the first processing device is further configured to provide the update to the second processing device.

2. The system of claim 1, wherein the first suitability grade is further determined based upon a processing device health of the particular processing device.

3. The system of claim 2, wherein the first suitability grade is further determined based upon a component utilization of the particular processing device.

4. The system of claim 3, wherein the first suitability grade is given as:

$$H(A(C)+B/(U))$$

where H is a numeric indication of the processing device health, C is the number of wireless interface connections, U is the component utilization, and A and B are weighting factors.

5. The system of claim 1, wherein each processing device comprises a wireless communication interface configured to set up the first and second wireless interface connections.

6. The system of claim 5, wherein the wireless communication interface comprises a Bluetooth-Low Energy interface.

7. The system of claim 1, wherein the update comprises one of a BIOS update, a UEFI update, and a processing device firmware update.

8. A method, comprising:
    determining, by a first one of a plurality of processing devices of a data center, a first suitability grade for the first data processing device, wherein the first suitability grade is determined based upon a number of wireless interface connections the particular processing device has with the other processing devices;
    receiving, by the first processing device, a second suitability grade from a second one of the processing devices via a first wireless interface connection set up with the second processing device;
    determining that the first suitability grade is higher than the second suitability grade;
    providing, by the first processing device, an indication to the second processing device that the first processing device is a master processing device via the first wireless interface connection in response to determining that the first suitability grade is higher than the second suitability grade;
    setting up, by the first processing device, a second wireless interface connection with a mobile device;
    receiving, by the first processing device, an update for the second processing devices from the mobile device; and
    providing, by the first processing device, the update to the second processing device.

9. The method of claim 8, wherein the first suitability grade is further determined based upon a processing device health of the first processing device.

10. The method of claim 9, wherein the first suitability grade is further determined based upon a component utilization of the first processing device.

11. The method of claim 10, wherein the first suitability grade is given as:

$$H(A(C)+B/(U))$$

where H is a numeric indication of the processing device health, C is the number of wireless interface connections, U is the component utilization, and A and B are weighting factors.

12. The method of claim 8, wherein each processing device comprises a wireless communication interface configured to set up the first and second wireless interface connections.

13. The method of claim 12, wherein the wireless communication interface comprises a Bluetooth-Low Energy interface.

14. The method of claim 8, wherein the update comprises one of a BIOS update, a UEFI update, and a processing device firmware update.

15. An information handling system, comprising:
a memory; and
a processor configured to:
  determine a first suitability grade for the information handling system, wherein the first suitability grade is determined based upon a number of wireless interface connections the particular processing device has with the other processing devices;
  receive a second suitability grade from another information handling system via a first wireless interface connection set up with the other information handling system;
  determine that the first suitability grade is higher than the second suitability grade;
  provide an indication to the other information handling system that the information handling system is a master information handling system via the first wireless interface connection in response to determining that the first suitability grade is higher than the second suitability grade;
  set up a second wireless interface connection with a mobile device;
  receive an update for the other information handling system from the mobile device; and
  provide the update to the other information handling system.

16. The information handling system of claim 15, further comprising a wireless communication interface configured to set up the first and second wireless interface connections.

17. The information handling system of claim 16, wherein the wireless communication interface comprises a Bluetooth-Low Energy interface.

18. The information handling system of claim 15, wherein the update comprises one of a BIOS update, a UEFI update, and a processing device firmware update.

* * * * *